(12) United States Patent
George et al.

(10) Patent No.: US 6,351,086 B1
(45) Date of Patent: Feb. 26, 2002

(54) DISPLAY CORRECTION WAVEFORM GENERATOR FOR MULTIPLE SCANNING

(75) Inventors: John Barrett George, Carmel, IN (US); Gunter Gleim, Villingen (DE); Albert Runtze, Villingen (DE); Fredrich Heizmann, Villingen (DE)

(73) Assignee: Thomson Lincensing S. A., Cedex (FR)

( * ) Notice: Subject to any disclaimer, the term of this patent is extended or adjusted under 35 U.S.C. 154(b) by 0 days.

(21) Appl. No.: 09/410,245

(22) Filed: Sep. 30, 1999

(51) Int. Cl.[7] .................................................. G09G 1/04
(52) U.S. Cl. ............. 315/370; 315/368.18; 315/368.21
(58) Field of Search ................................. 315/370, 371, 315/368.18, 368.21, 382.1; 345/10, 11

(56) References Cited

U.S. PATENT DOCUMENTS

| | | | | |
|---|---|---|---|---|
| 4,463,288 A | * | 7/1984 | Judd | 315/371 |
| 4,916,365 A | | 4/1990 | Arai | 315/383 |
| 4,980,614 A | * | 12/1990 | Yamada et al. | 315/368 |
| 5,323,092 A | * | 6/1994 | Helfrich et al. | 315/371 |
| 5,412,290 A | * | 5/1995 | Helfrich | 315/371 |
| 5,448,140 A | * | 9/1995 | Douken et al. | 315/371 |
| 5,471,121 A | | 11/1995 | Elgert | 315/382 |
| 5,512,804 A | * | 4/1996 | Yamamoto | 315/382.1 |
| 5,959,608 A | * | 9/1999 | Van Dalfsen | 345/134 |
| 6,069,673 A | | 5/2000 | Yoshida et al. | 348/806 |
| 6,124,685 A | * | 9/2000 | Toriu et al. | 315/370 |

FOREIGN PATENT DOCUMENTS

| | | | | |
|---|---|---|---|---|
| DE | 19754905 A1 | 2/1999 | | H04N/3/26 |
| EP | 0554836 A2 | 2/1993 | | H04N/3/233 |

\* cited by examiner

*Primary Examiner*—Don Wong
*Assistant Examiner*—Thuy Vinh Tran
(74) *Attorney, Agent, or Firm*—Joseph S. Tripoli; Harvey D. Fried; Francis A. Davenport

(57) ABSTRACT

A method for generating display correction waveforms for a CRT display comprises the steps of selecting one of a plurality of trace portions for forming part of a correction waveform, the trace portions having different average values. Completing each of the correction waveform by combining each selected trace portion with a respective retrace portion such that all completed correction waveforms have a predetermined average value.

17 Claims, 2 Drawing Sheets

DISPLAY CORRECTION WAVEFORM GENERATOR FOR MULTIPLE SCANNING

This invention relates generally to correction waveform generation in an image display, and more particularly to a waveform generator operable at a plurality of display standards.

BACKGROUND OF THE INVENTION

Waveforms comprising multiple frequency components frequently include a DC component which renders the signal essentially unipolar. However, removal of the DC component, for example, by capacitive coupling results in the loss of the unipolar characteristic with the resultant waveform being disposed equally in area, positively and negatively about an average waveform value. This average value is dependent on the waveform shape, thus when AC coupled waveforms with differing shapes produce differing average values with respect to the waveform peaks. Hence the AC peak potentials received by the circuitry following the AC coupling are altered, and vary in accordance with differing waveform shapes. In an exemplary cathode ray tube the distance from the center of electron beam deflection is, in general, shortest to the center of the display screen, with the distance increasing to maximum values in the screen corners. Thus to achieve consistent beam landing or a focused electron beam over the complete screen area requires that a DC focus voltage is combined with a signal waveform comprising multiple frequencies, for example, horizontal and or vertical frequency parabolic shaped waveforms. Typically this parabolic waveform is generated with low voltages near the system ground potential and added to the high voltage DC focus voltage via an AC coupling. The amplitude of this parabolic signal has a factory determined value, since the distances between all screen locations and the center of electron beam deflection are known and fixed. Thus, a single focus control, which adjusts a DC potential may be provided to allow optimum focus to be obtained, not only in the screen center, but at all screen locations. Such overall optimized adjustment assumes an accurately determined factory set amplitude value for the generally parabolic shaped signals. Although the geometric relationship between the display screen and electron beam are fixed and hence not standards specific, a display device may be capable of operation at multiple display standards with various scanning frequencies and differing retrace and blanking times. Thus a parabolic waveform generator is required which is responsive to the display standard, follows the scanning frequency, is capable of differing phasing relative to a vertical retrace pulse and is responsive to differing blanking durations. Such varieties of waveform shaping and phasing consequently vary the AC peaks with respect to the DC component of the waveform. Hence, when this exemplary waveform is ultimately AC coupled for addition to the high DC voltage for DC focus control, the loss of the DC component of the waveform may necessitate re-adjustment or optimization of the DC focus control voltage. Hence a display operable at multiple scanning and display standards, may require individual focus control adjustment for each display standard.

SUMMARY OF THE INVENTION

A method for generating display correction waveforms for a CRT display comprises the steps of selecting one of a plurality of trace portions for forming part of a correction waveform, the trace portions having different average values. Completing each of the correction waveform by combining each selected trace portion with a respective retrace portion such that all completed correction waveforms have a predetermined average value.

DETAILED DESCRIPTION

Figure 1:
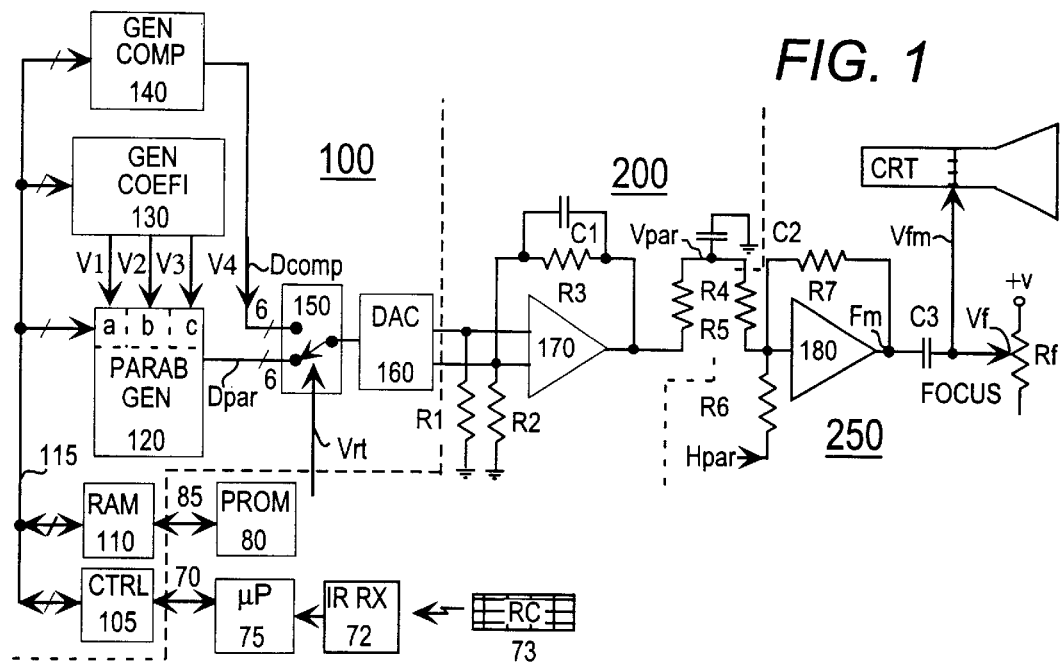
FIG. 1 illustrates an exemplary parabolic waveform signal generator coupled to provide dynamic focus in a cathode ray tube.

An exemplary digital parabolic waveform signal generator is illustrated in FIG. 1, coupled, for example, to provide dynamic focus, or electron beam landing correction in a cathode ray tube. The digital parabolic waveform signal generator is depicted in area 100, which may form part of an inventive integrated circuit, for example, ST Microelectronics type STV2050. The digital waveform generator 100 is coupled to area 200 which includes a differential amplifier and lowpass filter, which is coupled to dynamic focus signal generator 250, and cathode ray tube CRT. Digital waveform generator 100 includes a digital controller CTRL 105 which controls all functions within generator 100 via data bus 115, and provides control communication via a data bus 70 to an external microprocessor 75. A RAM 110 is connected to an external EEPROM memory (PROM 80) via a dedicated data bus 85 from which it receives operating data at power on. RAM 110 stores operating data values for an exemplary display device, but in particular, data specific to the generation of a parabolic waveform shape by generator 120. Data bus 115 supplies parabola specific data from RAM 110 to parabola generator 120, coefficient data to generator 130 and compensation data to generator 140. Parabola generator 120 generates a parabolic waveshape Dpar represented by six bit digital values in accordance with specified amplitude values or coefficients, occurring at specific times during trace or active picture time. Compensation generator 140 forms a six bit digital value Dcomp which is coupled as one input to selector switch 150. Output Dpar from generator 120 is coupled as a second input to switch 150 which is controlled by a vertical rate signal Vrt occurring during a vertical retrace period. Thus switch 150 couples the digital parabolic waveform Dpar to digital to analog converter 160 during active picture, or vertical trace time, and selects digital word Dcomp for digital to analog conversion by DAC 160 during the vertical retrace period.

Digital to analog converter 160 generates an analog signal as a differential output which is coupled to amplifier 170. Amplifier 170 is configured as a differential input amplifier, with input resistors R1 and R2 of similar values to provide improved stability with temperature. The gain of amplifier 170 is determined in part by resistor R3 and capacitor C1, which provides frequency dependent negative feedback. The analog signal from DAC 150 is parabolic in shape comprised of up to 64 discrete amplitude levels where each level, or amplitude value is held constant for a number of line periods. These discrete amplitude values, which describe the vertical parabola, are only permitted to change during horizontal retrace periods. The changes in parabolic signal values or steps generate transients which are removed by lowpass filtering resulting from feed back capacitor C1 of amplifier 170 and lowpass filtering at the amplifier output provided by series connected resistor R4 and shunt connected capacitor C2.

Figure 2A:
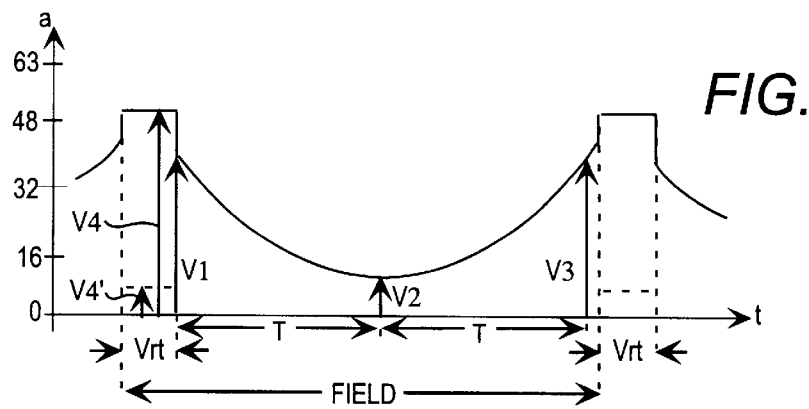
FIG. 2A illustrates a first inventive parabolic waveform.

The lowpass filtered, vertical rate parabolic signal Vpar, depicted in FIG. 2A, is coupled via resistor R5 to summing amplifier 180 of area 250. A horizontal rate parabolic signal Hpar, derived from an unshown generator, is coupled to summing amplifier 180 via resistor R6. As is well known, negative feed back from the amplifier output via resistor R7 forms a low, or virtual earth input impedance which facilitates the summing of the input parabolic signals in inverse proportion to the value of the input resistors R5 and R6. In addition to summing the vertical and horizontal rate parabolic signals, amplifier 180 also provides voltage gain such that summed output signal has an amplitude in the range of approximately 600 volts which is coupled via capacitor C3 to the wiper of focus potentiometer $R_f$. Thus the summed vertical and horizontal rate parabolic signals form a focus modulation signal Fm which is added to the DC focus voltage $V_f$, for example 8.5K volts, generated by potentiometer $R_f$ and applied as waveform $V_{fm}$ to the focus electrode of cathode ray tube CRT.

Coefficient generator 130 forms parabola amplitude determining coefficients as three digital words V1, V2 and V3 which set the amplitude of the parabola at specific time intervals to be generated by generator 120. The coefficients are independent of one another but have fixed positions or line counts relative to each other within the period of a field. For example, in FIG. 2A, the time between ordinates V1 and V2 is the same as that between ordinates V2 and V3. A field repetition rate parabola is illustrated in FIG. 2A, with a maximum amplitude defined by 6 bits, giving 64 possible amplitude values. The parabola position or phase within the field period is also adjustable, for example by offsetting a starting point of a counter which determines the time between ordinates V1, V2 and V3. The vertical position adjustment of phasing of the parabolic waveform may be performed by an exemplary remote control RC73 which communicates with microprocessor 75 via an infra red receiver IRRX, 72, or during factory setup by a direct data bus connection to microprocessor 75 (not shown).

Generator 120 performs calculations which cause the generation of a parabola that passes through the three user defined amplitude values. The general form of equation for a parabolic waveform generation is, Parabola=$ax^2+bx+c$, where variables a, b, c and Z are calculated as follows from the user defined values for V1, V2 and V3, $a=1/Z^2*(2V3-4*V2+*V1)$, $b=1/Z*(-V3+4*V2-3*V1)$, $c=V1$, $Z=12*(VGD+1)$, where VGD, vertical grid distance, represents a vertical image dimension measured in scan lines, which may have values between 11 and 63. During setup the parabola amplitude coefficients V1, V2 and V3 are adjusted in conjunction with focus control $R_f$ to achieve optimum overall CRT focus.

Data representing coefficient V4 is read from RAM 115 and formed into digital word V4 by compensation data generator 140. Data switch 150 provides selection between parabola data from generator 130 and compensation data representative of a fixed or DC value from generator 140. Switch 150 is controlled by a vertical rate signal Vrt to select DC compensation data during the vertical retrace period and parabolic waveform data for the active part of the field period. The function coefficient V4 value will be explained with reference to FIGS. 2A, 2B and 2C.

Figure 2B:
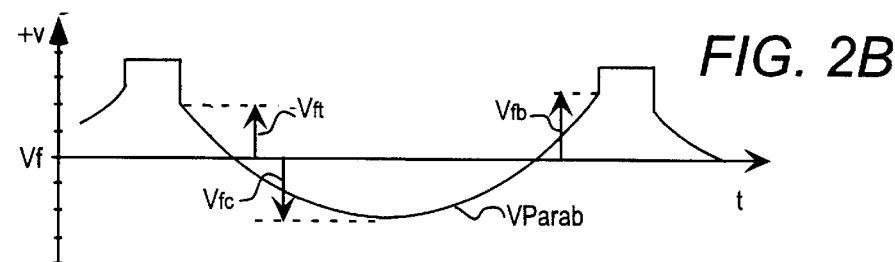
FIG. 2B illustrates AC coupling of FIG. 2A waveform with inventive coefficient $V_4$.
Figure 2C:
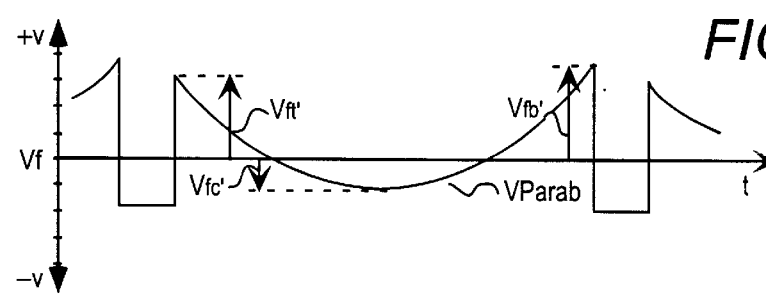
FIG. 2C illustrates AC coupling of FIG. 2A waveform with inventive coefficient $V_4'$.

In FIG. 2A parabolic signal Vpar is illustrated with coefficient V4 having two different values namely $V_4$ and $V_4'$ (shown with a dashed line). FIGS. 2B and 2C depict signal Vpar, of FIG. 2A, coupled via summing amplifier 180 and capacitor C3 to form of focus waveform Vfm. However, since the horizontal component of waveform Vfm is approximately double that of the vertical component, in the interest of drawing clarity FIGS. 2B/2C show only the vertical rate parabolic component of signal Fm. The AC coupling of signal Fm by capacitor C3 results in the loss of the waveform DC component, which consequently results in signal Fm to be disposed symmetrically, in terms of waveform polarities, about the DC focus voltage $V_f$. Thus, as described, with the amplitude of signal Fm being factory determined and preset, exemplary focus control $R_f$ may be adjusted to achieve optimum CRT focus at the screen center by means of peak voltage value $V_{fc}$, with focusing at the screen top and bottom being determined by cusp voltages $V_{ft}$ and $V_{fb}$, respectively. In actuality, if waveform $V_{fm}$ is appropriately shaped by means of coefficient value manipulation, optimum focus may be achieved over the whole CRT display surface.

However, as has been described previously, changes in the vertical parabolic signal shape, for example as depicted in FIG. 2A by coefficient $V_4'$ shown with the dashed line, cause the mean value to be different. In FIGS. 2B and 2C the parabolic waveforms Vparab are identical in both shape and amplitude. For example, in FIG. 2B if the waveform amplitude is measured relative to the mean or average value by the addition of values Vft+Vfc, this value is equal to the corresponding signal amplitudes Vft'+Vfc' of FIG. 2C. However, since the mean values of the waveforms shown in FIGS. 2B and 2C are different, the optimized center screen focus of FIG. 2B, resulting from the addition of exemplary peak signal amplitude Vfc and DC value Vf is no longer optimum for the waveform depicted in FIG. 2C as a consequence of the diminished peak-amplitude of signal Vfc' relative to the mean value of the waveform. In fact the whole screen is defocused as a result of the differing mean values which necessitates readjustment of focus control $R_f$ to restore overall optimum focus.

FIGS. 2B and 2C illustrate that coefficient V4, which is selected during the vertical retrace period and thus plays no CRT electrode control, may advantageously provide compensation for changes in the mean value of focus modulation waveforms generated for differing display or deflection standards. For example, differing display standards may be considered with reference to FIG. 2A, which indicates a field period comprising a vertical retrace or vertical blanking interval Vrt and active scan period 2T. In the NTSC television signal format, the field period comprises 262.5 horizontal line periods with interval Vrt representing approximately 20 line periods, thus the ratio of retrace or vertical blanking interval to the field period is approximately 1:13 or 8%. However, in the ATSC 1080I high definition television standard or ANSI/SMPTE standard 274M, a frame comprises 1125 lines with 1080 active line periods. Thus there are 45 lines of non-active picture per frame which in the interlaced format would be distributed between each field comprising 562.5 horizontal line periods. The non-active picture or blanking and vertical retrace interval Vrt representing approximately 22.5 line periods. Hence the ratio of retrace or vertical blanking interval to the field period is approximately 1:25 or 4% which is approximately half that of the NTSC format. This ratiometric difference in waveform shape or timing may be obviated by advantageous use of coefficient V4 which has differing a preset standard specific values, selected to maintain optimum beam landing or focus by compensating for differences in the average value of vertical rate correction waveforms.

Figure 3:
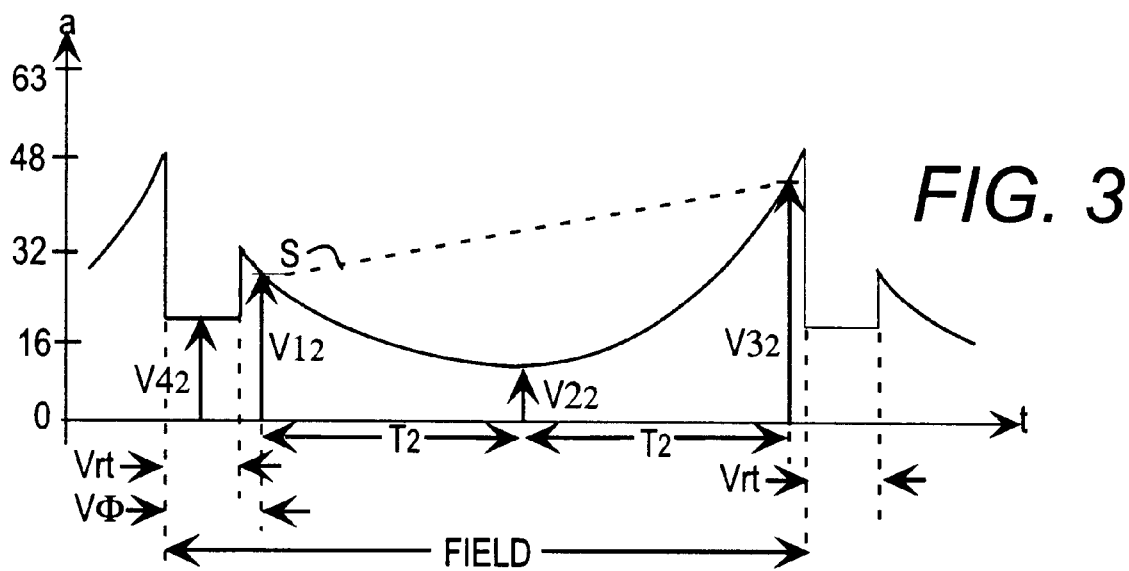
FIG. 3 illustrates a second inventive parabolic waveform.

FIG. 3 depicts a parabolic waveform shape, for example, generated in accordance with a display image having a vertical blanking width different to that of the signal for which the. parabolic signal of FIG. 1 was generated. The waveform depicted in FIG. 3 is shaped in accordance with the values of ordinates $V1_2$, $V2_2$ and $V3_2$, where ordinate $V1_2$ is delayed or phase shifted by $V\phi$ relative to the start of the vertical retrace signal Vrt. In addition the waveform shape may be considered to represent a parabola superimposed on a field rate ramp or sawtooth signal as depicted by broken line S. Advantageously compensation data word $V4_2$ provides an adjustable signal component which allows differing waveform shapes to have substantially similar DC components, thus facilitating operation at multiple display standards without focus readjustment or multiple focus values.

What is claimed is:

1. A method for generating display correction waveforms for a CRT display, comprising the steps of:
   a) selecting one of a plurality of trace portions for forming part of a correction waveform, said trace portions having different average values; and,
   b) completing each said correction waveform by combining each said selected trace portion with a respective retrace portion such that all completed correction waveforms have a predetermined average value.

2. The method of claim 1, further comprising the step of:
   selecting among said plurality of trace portions in accordance with different operating characteristics of said CRT display.

3. The method of claim 2, wherein said different operating characteristics comprise a plurality of display scanning standards.

4. The method of claim 1, further comprising the step of:
   determining coefficient values to form said plurality of trace portions; and,
   storing said plurality of trace portions.

5. The method of claim 1, further comprising the step of:
   determining coefficient values to form said plurality of retrace portions; and,
   storing said plurality of retrace portions.

6. An apparatus for generating display correction waveforms for a CRT display, comprising
   means for generating one of a plurality of predetermined trace portions for forming part of a correction waveform, said trace portions having different average values; and,
   means for combining each said selected trace portion with a respective retrace portion to form said correction waveform such that all correction waveforms have a predetermined average value.

7. The apparatus of claim 6, wherein said generating means is responsive to a group of coefficient values.

8. The apparatus of claim 7, wherein said group of coefficient values are coupled to said generating means in accordance with an operating mode of said CRT display.

9. The apparatus of claim 6, wherein said respective retrace portion is generated responsive to a coefficient value.

10. The apparatus of claim 6, wherein said combining means is controlled responsive to a vertical retrace signal and selects said retrace portion during a period of said vertical retrace signal with said trace portion selected during an absence of said vertical retrace signal.

11. The apparatus of claim 6, further comprising a capacitor for AC coupling said correction waveform to said CRT display for correction wherein said predetermined average value permits said AC coupling of said correction waveform without any substantial change in said predetermined average value.

12. The apparatus of claim 6, further comprising a capacitor for AC coupling said correction waveform to said CRT display for correction, said correction waveform having a peak value relative to said predetermined average value, wherein said predetermined average permits said AC coupling of said correction waveform without any substantial change in said peak value relative to said predetermined average value.

13. The apparatus of claim 6, further comprising a capacitor for AC coupling said correction waveform to said CRT display for correction of electron beam landing errors.

14. The apparatus of claim 6, wherein said correction waveform is coupled to said CRT display for correction of focus.

15. An apparatus for generating display correction waveforms for a CRT display, comprising:
   means for generating one of a plurality of predetermined trace portions forming part of a correction waveform, said trace portions having different average values;
   means for combining each said selected trace portion with a respective retrace portion to form said correction waveform such that all correction waveforms generated by said apparatus have a predetermined average value; and,
   a capacitor for coupling said correction waveform to said CRT display for correction wherein said predetermined average value permits AC coupling by said capacitor without any significant change to said predetermine value.

16. An apparatus for generating display correction waveforms for a CRT display, comprising:
   means for generating one of a plurality of predetermined trace portions forming part of a correction waveform, said trace portions having different average values;
   means for combining each said selected trace portion with a respective retrace portion to form said correction waveform such that all correction waveforms generated by said apparatus have a predetermined average value; and,
   a capacitor for coupling said correction waveform to said CRT display for correction, said correction waveform having a peak value relative to said predetermined average value which permits AC coupling by said capacitor without any significant change to said peak value relative to said predetermined average value.

17. An apparatus for generating display correction waveforms for a CRT display, comprising:
   means for generating one of a plurality of predetermined trace portions forming part of a correction waveform, said trace portions having different average values; and,
   means for combining each said selected trace portion with a respective retrace portion to form said correction waveform such that all correction waveforms generated by said apparatus have a predetermined average value, and coupling said correction waveform to said CRT for correction of electron beam landing errors.

* * * * *

UNITED STATES PATENT AND TRADEMARK OFFICE
CERTIFICATE OF CORRECTION

PATENT NO. : 6,351,086 B1
DATED : February 26, 2002
INVENTOR(S) : John Barrett George, Gunter Glim, Albert Runtze and Fredrich Heizmann It is certified that error appears in the above-identified patent and that said Letters Patent is hereby corrected as shown below:

<u>Title page,</u>
Item [54], Title should be -- DISPLAY CORRECTION WAVEFORM GENERATOR FOR MULTIPLE SCANNING FREQUENCIES --

Signed and Sealed this

First Day of October, 2002

*Attest:*

JAMES E. ROGAN
*Attesting Officer*   *Director of the United States Patent and Trademark Office*